US008464617B2

(12) United States Patent
Zaloga et al.

(10) Patent No.: US 8,464,617 B2
(45) Date of Patent: Jun. 18, 2013

(54) HOLD AND DRIVE TOOL WITH DISENGAGEMENT CAPABILITY

(75) Inventors: Miroslaw Zaloga, Shelby Township, MI (US); Jonathan L. Dent, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 12/871,127

(22) Filed: Aug. 30, 2010

(65) Prior Publication Data

US 2012/0048066 A1 Mar. 1, 2012

(51) Int. Cl.
*B25B 23/14* (2006.01)
*B23P 11/00* (2006.01)

(52) U.S. Cl.
USPC ............................. 81/467; 29/525.02; 81/429

(58) Field of Classification Search
USPC .. 81/467, 429, 55, 56, 57.14, 9.24; 29/525.02
See application file for complete search history.

(56) References Cited

U.S. PATENT DOCUMENTS

| | | | | |
|---|---|---|---|---|
| 3,247,741 | A | 4/1966 | R.W. Batten | |
| 3,850,055 | A * | 11/1974 | Triplett | 81/56 |
| 5,553,519 | A * | 9/1996 | Pettit, Jr. | 81/56 |
| 5,582,079 | A | 12/1996 | Matsumura et al. | |
| 5,953,965 | A * | 9/1999 | Kaneyama et al. | 81/55 |
| 6,009,775 | A * | 1/2000 | Thompson et al. | 81/467 |
| 6,450,072 | B1 * | 9/2002 | Koester | 81/9.24 |

FOREIGN PATENT DOCUMENTS

| | | | |
|---|---|---|---|
| DE | 2328444 | A1 | 5/1973 |
| DE | 60002647 | T2 | 3/2004 |
| EP | 0988935 | A2 | 3/2000 |
| EP | 1935570 | A1 | 6/2008 |

* cited by examiner

*Primary Examiner* — Hadi Shakeri

(57) ABSTRACT

A hold and drive tool and method of operation for fastening parts together with a stud and nut. The tool may comprise a tool body including a drive member therein, with the drive member rotationally driven by a power source; a nut drive member engaging the drive member and including a nut engaging portion received on the nut and rotating the nut relative to the stud; a hold member including a hold shaft connected to a hold bit, with the hold bit located in the nut drive member and received on a hold feature on the stud to prevent the stud from rotating relative to the hold member; and a clutch secured to the tool body and the hold shaft, with the clutch selectively allowing for and preventing rotation of the hold shaft relative to the tool body.

5 Claims, 3 Drawing Sheets

HOLD AND DRIVE TOOL WITH DISENGAGEMENT CAPABILITY

BACKGROUND OF INVENTION

The present invention relates generally to tools for driving nuts onto a fasteners and more particularly to such tools that hold the fastener while driving the nut.

Some tools used to secure a nut to a fastener are designed to engage the fastener to prevent it from spinning as the nut is driven onto the fastener. Such tools are sometimes employed, for example, in the assembly of automotive vehicles. An issue with these types of tools is the durability of the hold member that prevents the fastener from rotating. At the end of the assembly operation putting the nut onto the fastener, the torque used to create the joint may transfer into the hold member. This may lead to premature failure of the tool, which results in the tool having to come off-line to change the hold member (or a portion thereof). This reduces the time the tool is available for use and adds to the cost of assembling the components being fastened together.

SUMMARY OF INVENTION

An embodiment contemplates a hold and drive tool for fastening parts together with a stud and nut. The tool may comprise a tool body including a drive member therein, with the drive member rotationally driven by a power source; a nut drive member engaging the drive member and including a nut engaging portion slidably received on the nut and rotating the nut relative to the stud; a hold member including a hold shaft connected to a hold bit, with the hold bit located in the nut drive member and slidably received on a hold feature on the stud to prevent the stud from rotating relative to the hold member; and a clutch secured to the tool body and the hold shaft, with the clutch selectively allowing for and preventing rotation of the hold shaft relative to the tool body.

An embodiment contemplates a method of fastening a plurality of parts together with a stud and nut using a hold and drive tool, the method comprising the steps of: sliding a nut drive member into engagement with the nut while sliding a hold bit of a hold member into engagement with a hold feature of the stud; securing a clutch to prevent the hold member from rotating relative to a tool body of the hold and drive tool; activating the hold and drive tool to cause the nut drive member to spin, screwing the nut onto the stud; and after the nut has been partially screwed onto the stud, releasing the clutch to allow the hold member to rotate relative to the tool body, whereby the hold bit no longer prevents the stud from rotating while the nut is screwed onto the stud.

An advantage of an embodiment is that the clutch control of the hold member reduces tool maintenance costs and down time when this tool is used to fasten components together.

DETAILED DESCRIPTION

Figure 1:
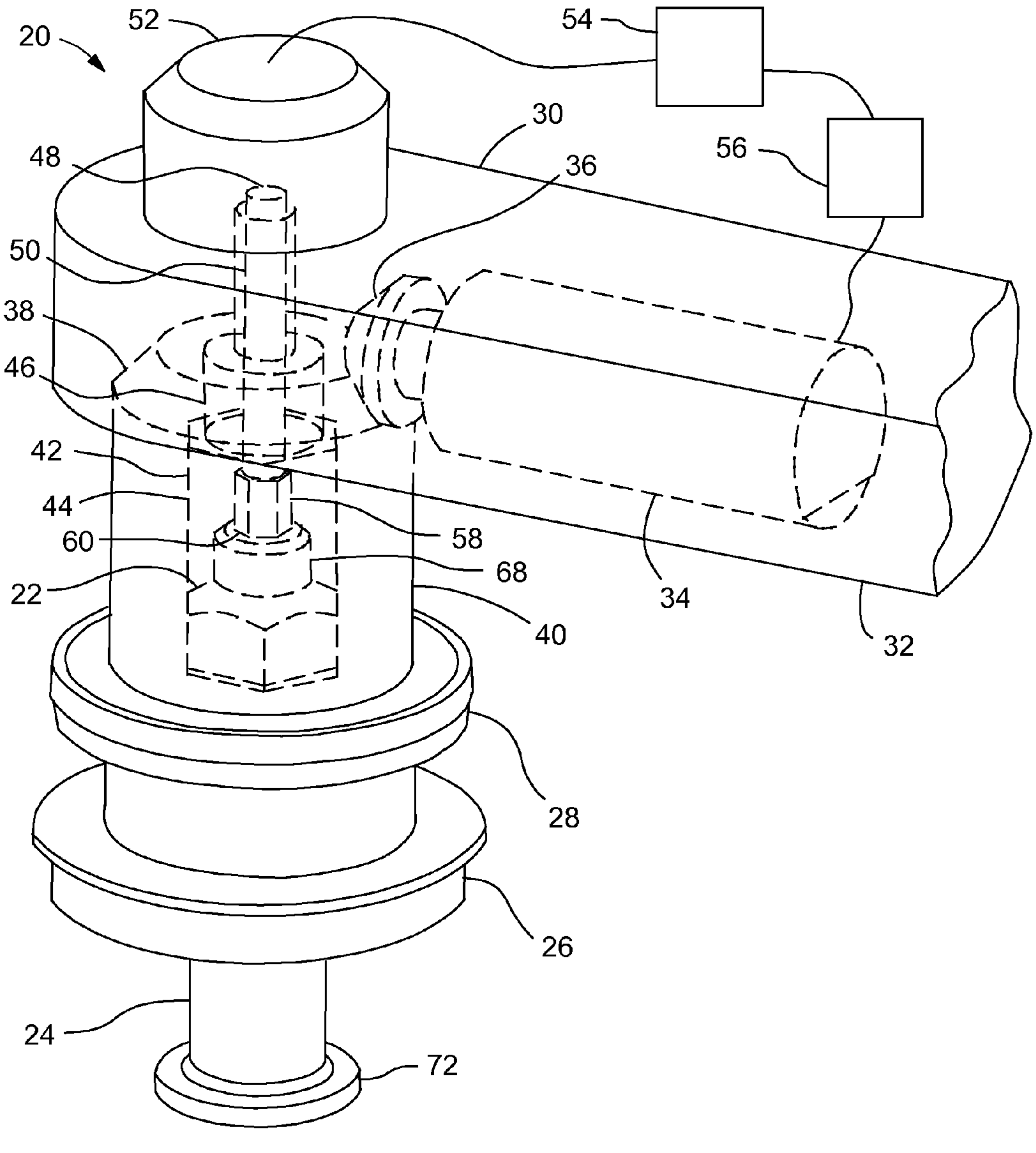
FIG. 1 is a schematic, perspective view of a hold and drive tool engaging a nut and a tapered stud.
Figure 2:
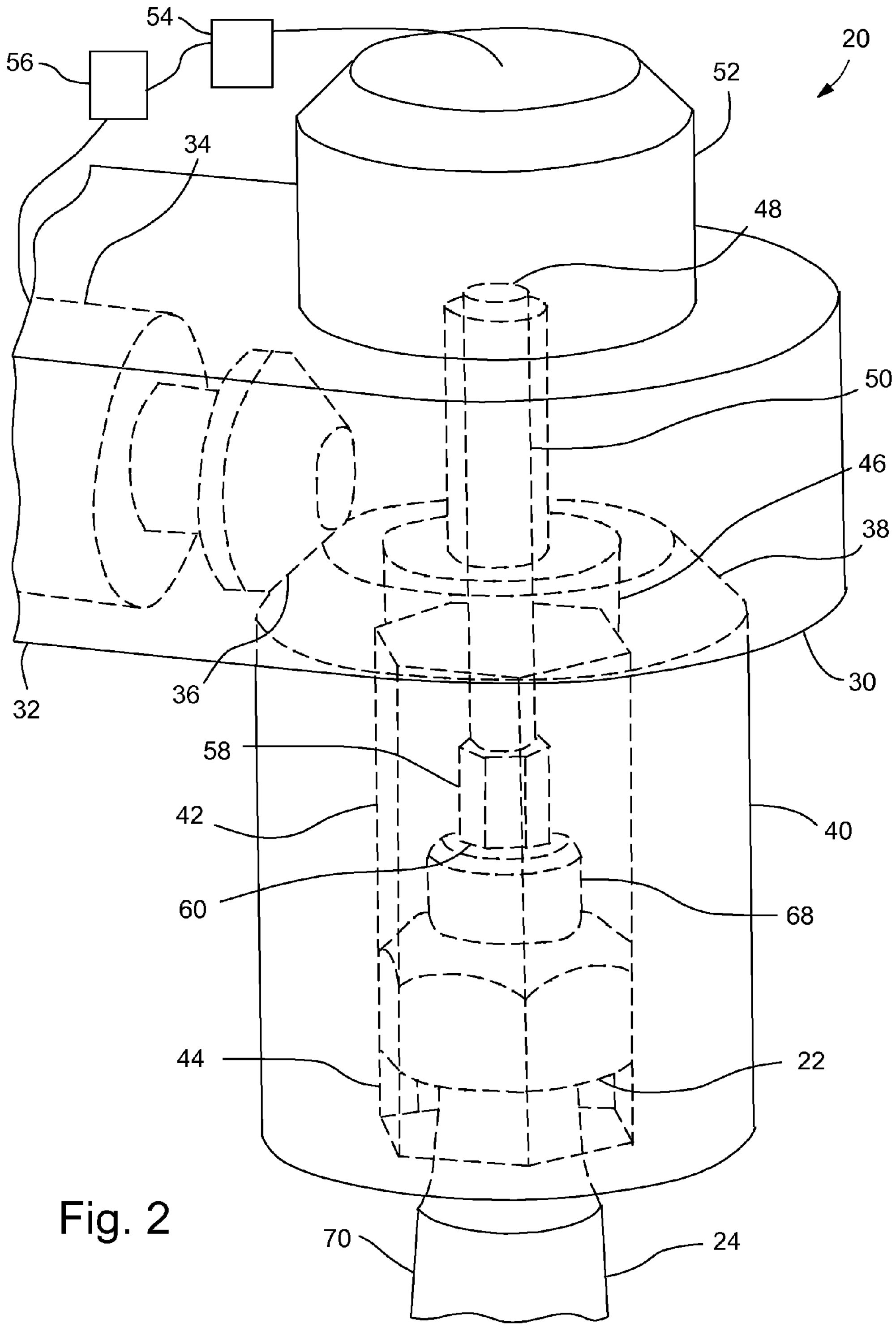
FIG. 2 is another schematic, perspective view of the hold and drive tool engaging the nut and tapered stud.
Figure 3:
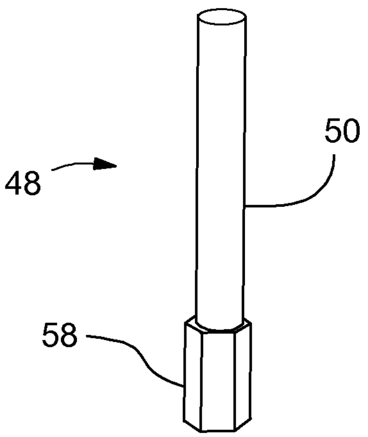
FIG. 3 is a schematic, perspective view of a hold member.

FIGS. 1-4 illustrate various portions of a hold and drive tool 20 engaging a nut 22 on a stud 24, which are used to secure a first member 26 (shown in FIG. 1) to a second member 28 (shown in FIG. 1). The stud 24 may be a tapered stud.

The hold and drive tool 20 includes a tool body 30 that may have a handle portion 32. A cavity in the tool body 30 includes a drive tool gear member 34, which may be, for example, electrically driven or pneumatically driven. The gear member 34 may include a bevel gear 36 that meshes with a mating bevel gear 38 on a nut drive member 40.

The nut drive member 40 includes a central bore 42 having a nut engaging portion 44 that is shaped to engage and rotate the nut 22. For example, this portion may be hexagonal if the nuts 22 to be driven are typical hexagonal nuts. Another portion 46 of the central bore 42 opens into a recess in the tool body 30 and allows for a hold member 48 to extend therethrough.

The hold member 48 has a hold shaft 50 connected to a hold bit 58. The hold shaft 50 extends through the portion 46 of the nut drive member 40, through the tool body 30, and into a clutch 52. The clutch 52 is secured to the tool body 30 and selectively allows the hold shaft 50 to rotate or not relative to the tool body 30. The clutch 52 may be any type of clutch that is capable of holding the shaft 50 to prevent rotation and selectively releasing the shaft 50 to allow rotation. The clutch 52 may have an adjustable torque setting that allows for a change in torque needed to disengage the clutch 52, if so desired.

The clutch 52 may be in communication with and controlled by a controller 54. The controller 54 may also control the activation and torque produced by the hold and drive tool 20. A torque sensor 56 (or other means of estimating torque) may be employed to determine the torque applied by the hold and drive tool 20. The controller may be any combination of hardware and software as is known to those skilled in the art.

The hold bit 58 is shaped to slide into or over a mating hold feature 60 on the end of the stud 24. In the present embodiment, the hold feature 60 is a hexagonally shaped recess in the end of the stud 24. However, the hold feature 60 may also be a hexagonal outer surface (not shown) on the end of the stud 24. Basically, the hold feature 60 is any feature that can slidably mate with the hold bit 58 to prevent the stud 24 from rotating relative to the hold bit 58 while still allowing the nut 22 to slide over the end of the stud 24.

Figure 4:
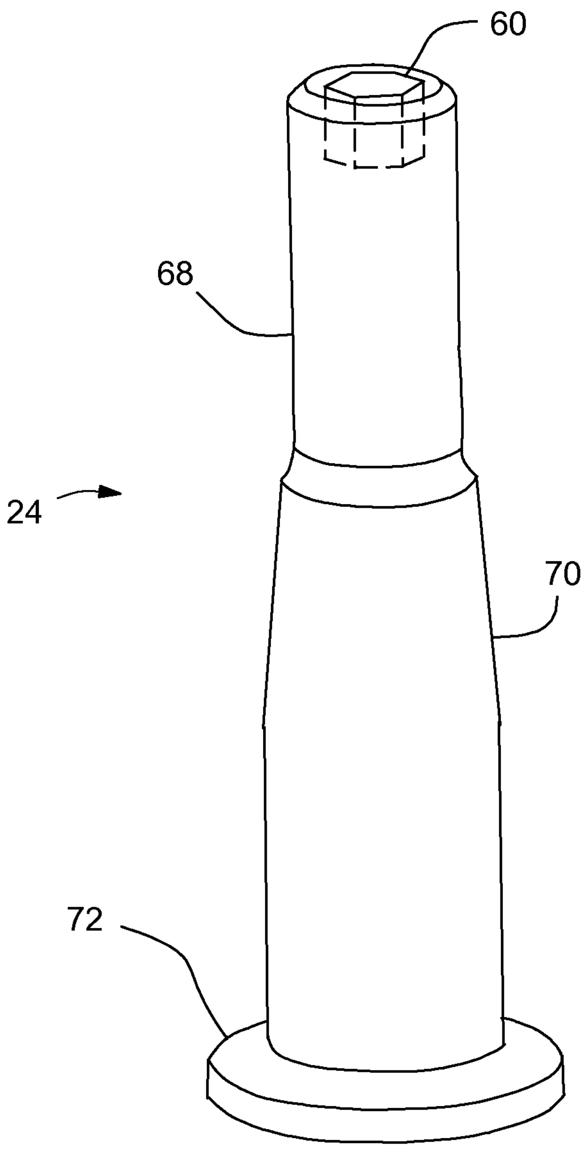
FIG. 4 is a schematic, perspective view of the tapered stud.

FIG. 1 shows an example of the parts 26, 28 that may be joined by the stud 24 and nut 22. The stud 24 in the exemplary embodiment is a tapered stud (as best seen in FIG. 4). The stud 24 includes the hold feature 60 adjacent to a threading portion 68 that mates with the nut 22. Adjacent to the threading portion 68 is a tapered portion 70 that tapers radially outward as it extends away from the threading portion 68. The stud 24 may also include a base portion 72 that retains the parts thereon.

The operation of the hold and drive tool 20 will now be discussed relative to FIGS. 1-4. The parts 26, 28 to be assembled are mounted on the stud 24. The nut 22 is located on the threading portion 68 of the stud 24. The hold and drive tool 20 is moved into position so that the nut 22 is received in the nut engaging portion 44 of the nut drive member 40 and the hold bit 58 is received in the hold feature 60 of the stud 24.

The tool 20 is activated, causing the drive tool gear member 34 to rotate the bevel gear 36, which causes the rotation of the nut drive member 40 via the mating bevel gear 38. When the tool 20 is activated, the clutch 52 engages the hold shaft 50 to prevent the hold member 48 from rotating relative to the tool body 30. This, in turn, prevents the stud 24 from rotating. As the nut drive member 40 rotates, the nut 22 is threaded onto the threading portion 68 of the stud 23.

At some point before the nut 22 is fully seated, the clutch 52 disengages the hold shaft 50. In the case where the stud 24 is tapered, this point may be when a predetermined torque is reached that is indicative of the friction in the taper joint being high enough to keep the stud 24 from spinning even with the hold member 48 released. In other cases, the clutch 52 may be released after a predetermined time or a predetermined amount of rotation of the nut 22. The controller 54 may be employed to determine when to disengage the clutch 52 and to actually cause the clutch 52 to disengage. The controller 54 may be programmable to adjust the disengagement based upon the particular parts 26, 28 and stud 24 being secured together. Thus, with the hold and drive tool 20 of the present invention, the undesirable torque on the hold bit 58 is avoided, which allows for improved tool wear and reduced downtime.

While certain embodiments of the present invention have been described in detail, those familiar with the art to which this invention relates will recognize various alternative designs and embodiments for practicing the invention as defined by the following claims.

What is claimed is:

1. A hold and drive tool for fastening parts together with a stud and nut, the tool comprising:

a tool body including a drive member therein, the drive member configured to be rotationally driven by a power source;

a nut drive member operatively engaging the drive member to be driven by the drive member, the nut drive member including a nut engaging portion configured to be slidably received on the nut and rotate the nut relative to the stud;

a hold member including a hold shaft connected to a hold bit, the hold bit located in the nut drive member and configured to be slidably received on a hold feature on the stud to prevent the stud from rotating relative to the hold member;

a clutch secured to the tool body and the hold shaft, the clutch configured to selectively allow for and prevent rotation of the hold shaft relative to the tool body;

a torque sensor operatively engaging the hold and drive tool to determine a torque value;

a controller operatively engaging the clutch and the torque sensor, the controller configured to cause the clutch to allow for rotation of the hold shaft relative to the tool body when the torque sensor senses a predetermined torque value; and wherein the stud is a tapered stud and the predetermined torque value is calculated to be high enough that a friction between the tapered stud and the parts is high enough to keep the stud from rotating as the nut is screwed onto the stud.

2. The tool of claim 1 wherein the hold bit is a hexagonal shape configured to fit into a mating hexagonal shaped recess in the stud.

3. The tool of claim 1 wherein the drive member is configured to be electrically driven.

4. The tool of claim 1 wherein the drive member is configured to be pneumatically driven.

5. A method of fastening a plurality of parts together with a stud and nut using a hold and drive tool, the method comprising the steps of:

(a) sliding a nut drive member into engagement with the nut while sliding a hold bit of a hold member into engagement with a hold feature of the stud;

(b) securing a clutch to prevent the hold member from rotating relative to a tool body of the hold and drive tool;

(c) activating the hold and drive tool to cause the nut drive member to spin, screwing the nut onto the stud; and (d) after the nut has been partially screwed onto the stud, releasing the clutch to allow the hold member to rotate relative to the tool body, whereby the hold bit no longer prevents the stud from rotating while the nut is screwed onto the stud; and wherein the stud is a tapered stud and step (d) is further defined by detecting a predetermined torque indicative of a friction between the tapered stud and the plurality of parts being high enough to keep the tapered stud from spinning, and releasing the clutch when the predetermined torque is reached.

* * * * *